(12) United States Patent
Tyson et al.

(10) Patent No.: US 10,257,906 B2
(45) Date of Patent: Apr. 9, 2019

(54) LOW VOLTAGE LIGHTING POWER SUPPLY SYSTEMS AND METHODS

(71) Applicant: Kichler Lighting LLC, Cleveland, OH (US)

(72) Inventors: Thomas Joseph Tyson, Cleveland, OH (US); John J. Andrisin, III, Brunswick, OH (US); John Joseph Ascherl, Medina, OH (US); Joseph John Janos, Phoenix, AZ (US)

(73) Assignee: Kichler Lighting LLC, Cleveland, OH (US)

( * ) Notice: Subject to any disclaimer, the term of this patent is extended or adjusted under 35 U.S.C. 154(b) by 0 days.

(21) Appl. No.: 15/828,856

(22) Filed: Dec. 1, 2017

(65) Prior Publication Data
US 2018/0160505 A1 Jun. 7, 2018

Related U.S. Application Data

(63) Continuation of application No. 15/358,679, filed on Nov. 22, 2016, now Pat. No. 9,839,094, which is a
(Continued)

(51) Int. Cl.
*F21V 33/00* (2006.01)
*H05B 33/08* (2006.01)
(Continued)

(52) U.S. Cl.
CPC ......... *H05B 33/0887* (2013.01); *H01R 24/30* (2013.01); *H05B 33/0815* (2013.01);
(Continued)

(58) Field of Classification Search
CPC ...... H05B 39/105; H05B 39/09; H05B 41/46; H05B 37/029; H05B 33/0815; H05B 33/0821; H05B 33/0827; H05B 33/0803; H05B 33/0818; H05B 41/2828; H05B 41/3921; H05B 41/3927; F21V 19/04; F21V 23/04; B63B 45/00; B63B 2725/00; B60Q 11/005; B60Q 11/002; G08B 5/38; G08G 1/095; G09G 3/3406; H03F 1/548; H02H 7/127; B23K 11/248; F02P 17/12;
(Continued)

(56) References Cited

U.S. PATENT DOCUMENTS

2005/0128751 A1* 6/2005 Roberge ............... F21K 9/00
362/276
2010/0110682 A1 5/2010 Jung
(Continued)

*Primary Examiner* — Minh D A
(74) *Attorney, Agent, or Firm* — Brooks Kushman, P.C.

(57) ABSTRACT

The present application discloses systems and methods for providing low voltage power for low voltage lighting sources, e.g., so-called landscape lighting. A low voltage lighting power supply includes an enclosure and a power circuit enclosed in the enclosure. In some embodiments the power circuit has a primary side and a secondary side. The primary side accepts power from a main power source and the secondary side has a plurality of separate output power circuits, each output power circuit generating a separate low voltage lighting power signal capable of lighting a plurality of low voltage light sources and each being rated for a particular output.

17 Claims, 13 Drawing Sheets

Related U.S. Application Data continuation of application No. 14/532,493, filed on Nov. 4, 2014, now Pat. No. 9,635,734.

(60) Provisional application No. 61/899,564, filed on Nov. 4, 2013.

(51) Int. Cl.
  *H05B 37/02* (2006.01)
  *H01R 24/30* (2011.01)
  *F21V 23/02* (2006.01)
  *F21W 131/109* (2006.01)

(52) U.S. Cl.
  CPC ......... *H05B 37/02* (2013.01); *H05B 37/0272* (2013.01); *F21V 23/023* (2013.01); *F21W 2131/109* (2013.01)

(58) Field of Classification Search
  CPC ............ G01R 31/3336; G03B 15/0452; G05D 25/02; H01H 9/0066; F21S 4/001; B60L 1/14; B61L 5/1881; G05F 1/14
  See application file for complete search history.

(56) References Cited

U.S. PATENT DOCUMENTS

| | | |
|---|---|---|
| 2012/0044350 A1 | 2/2012 | Verfuerth |
| 2012/0206050 A1 | 8/2012 | Spero |
| 2012/0235579 A1* | 9/2012 | Chemel ................. F21S 2/005 315/152 |
| 2013/0271040 A1* | 10/2013 | Chen ................. H05B 33/0815 315/307 |

* cited by examiner

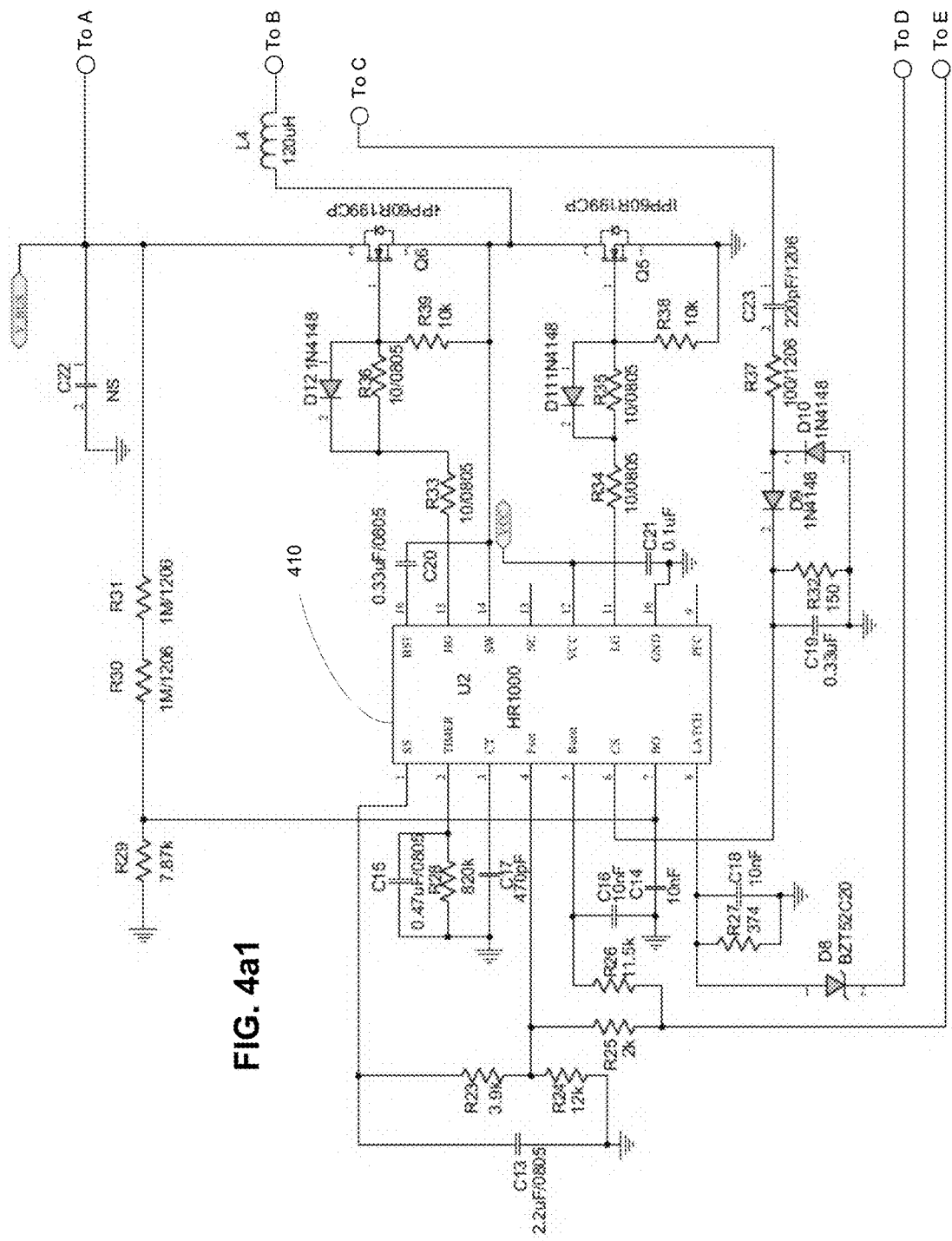
FIG. 4a1

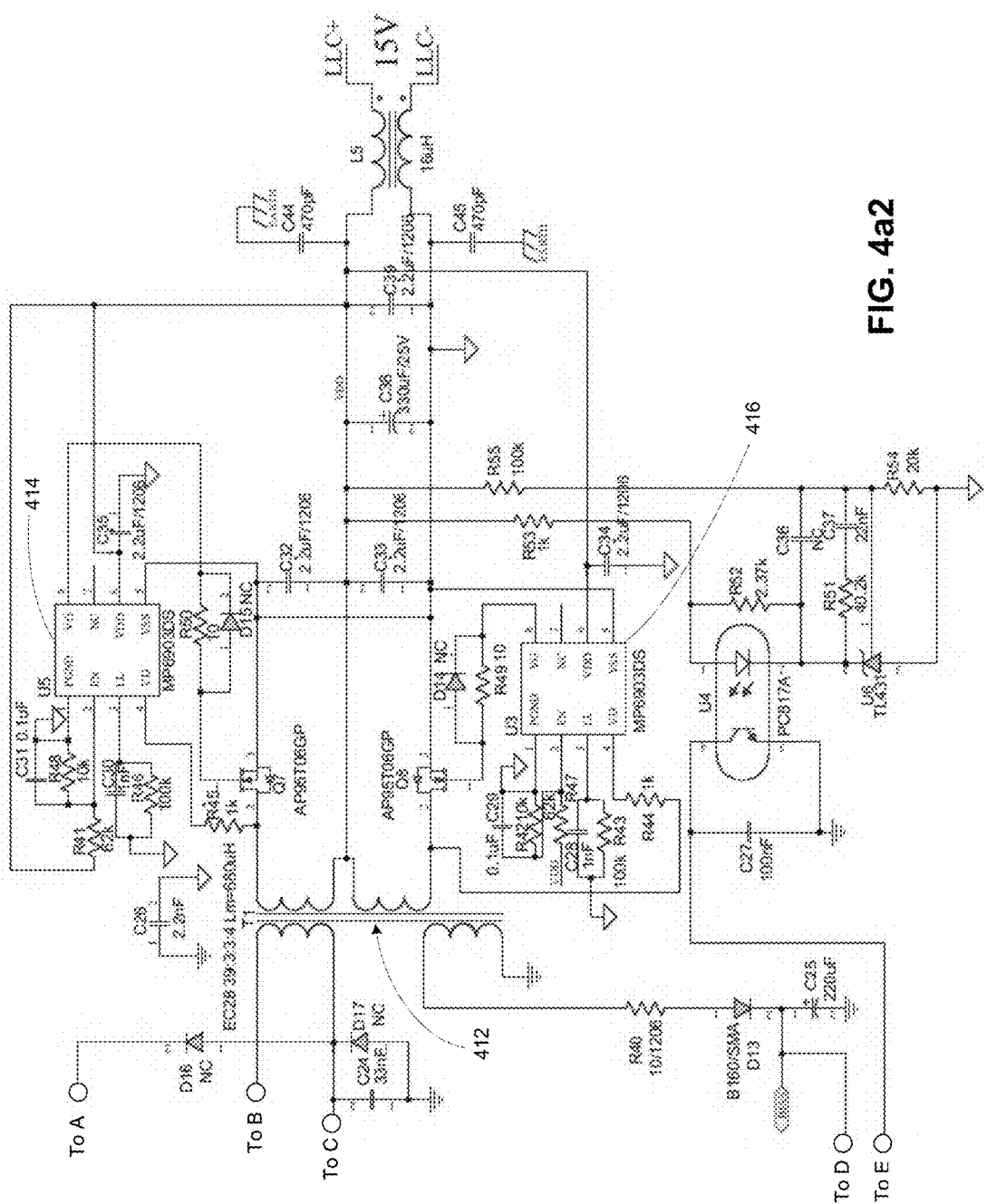
FIG. 4a2

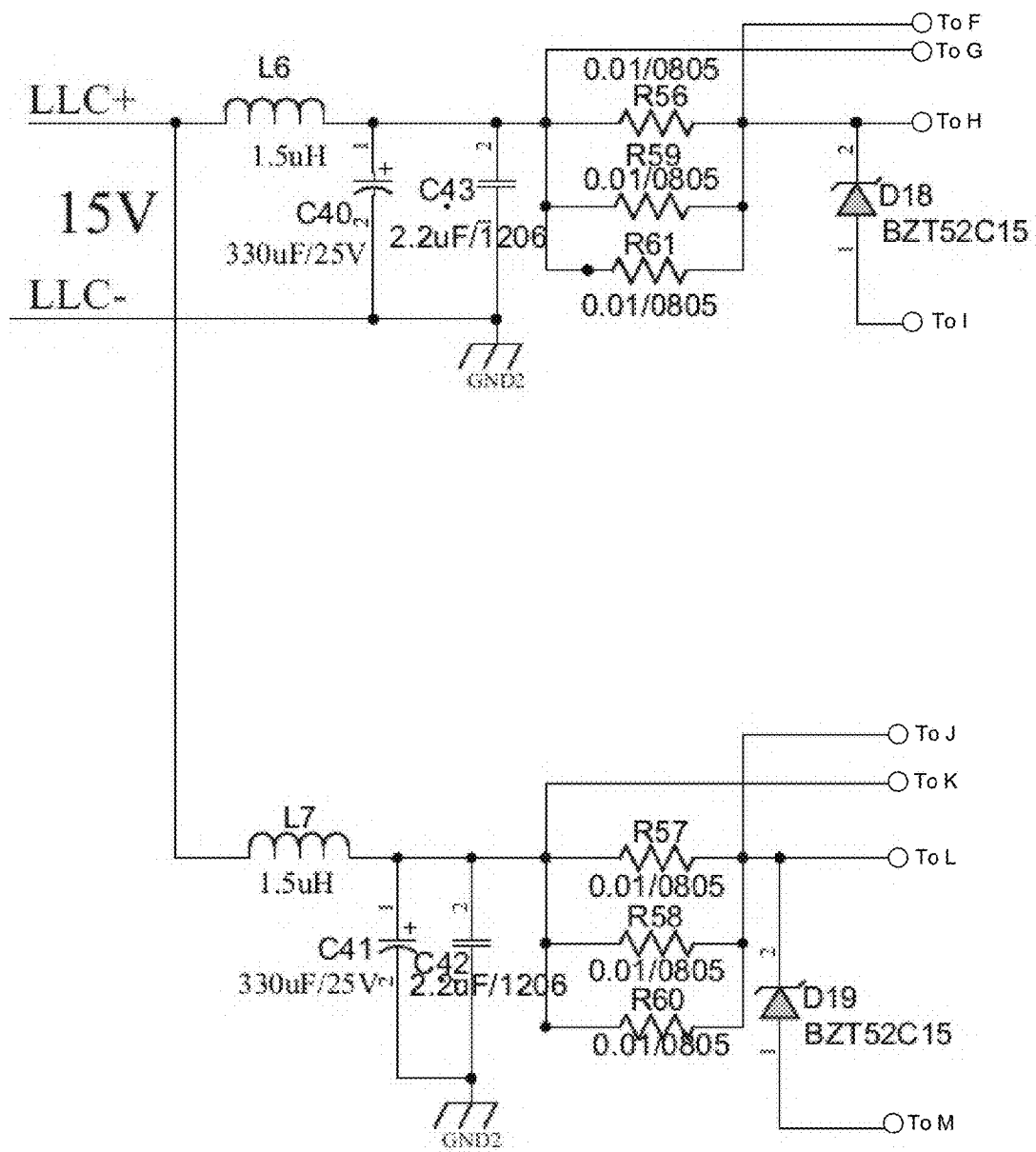
FIG. 4b1

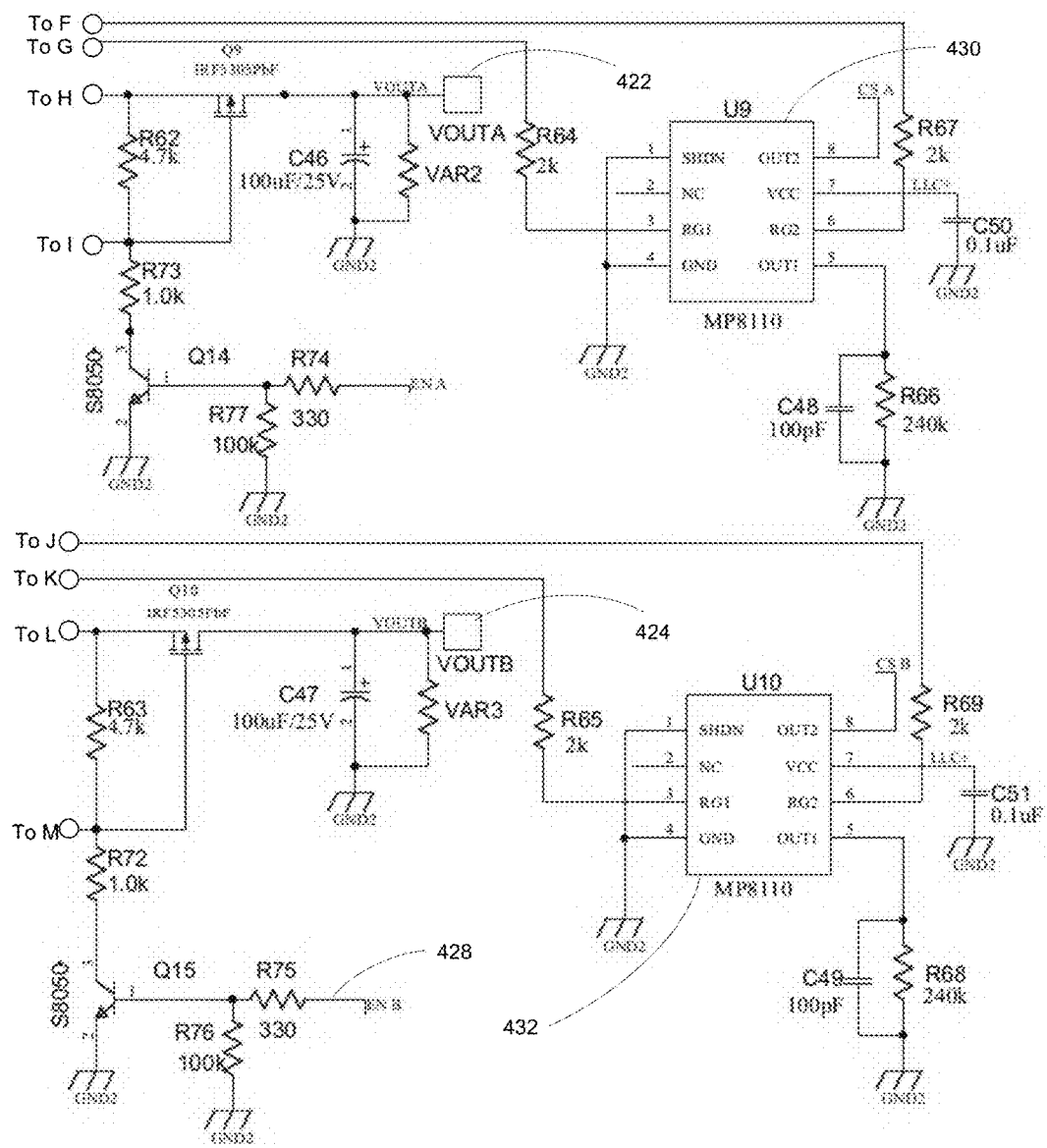
FIG. 4b2

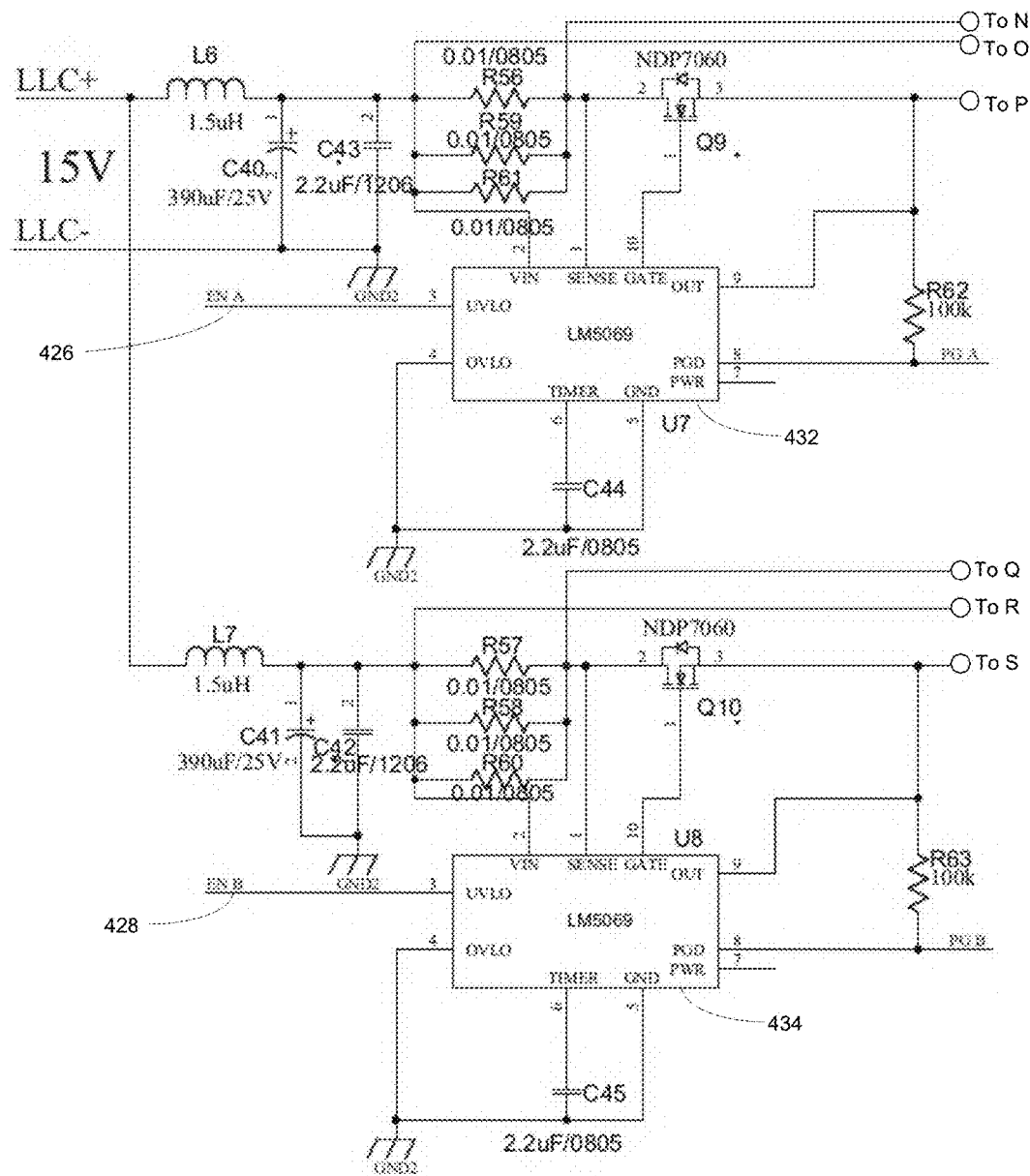
FIG. 4c1

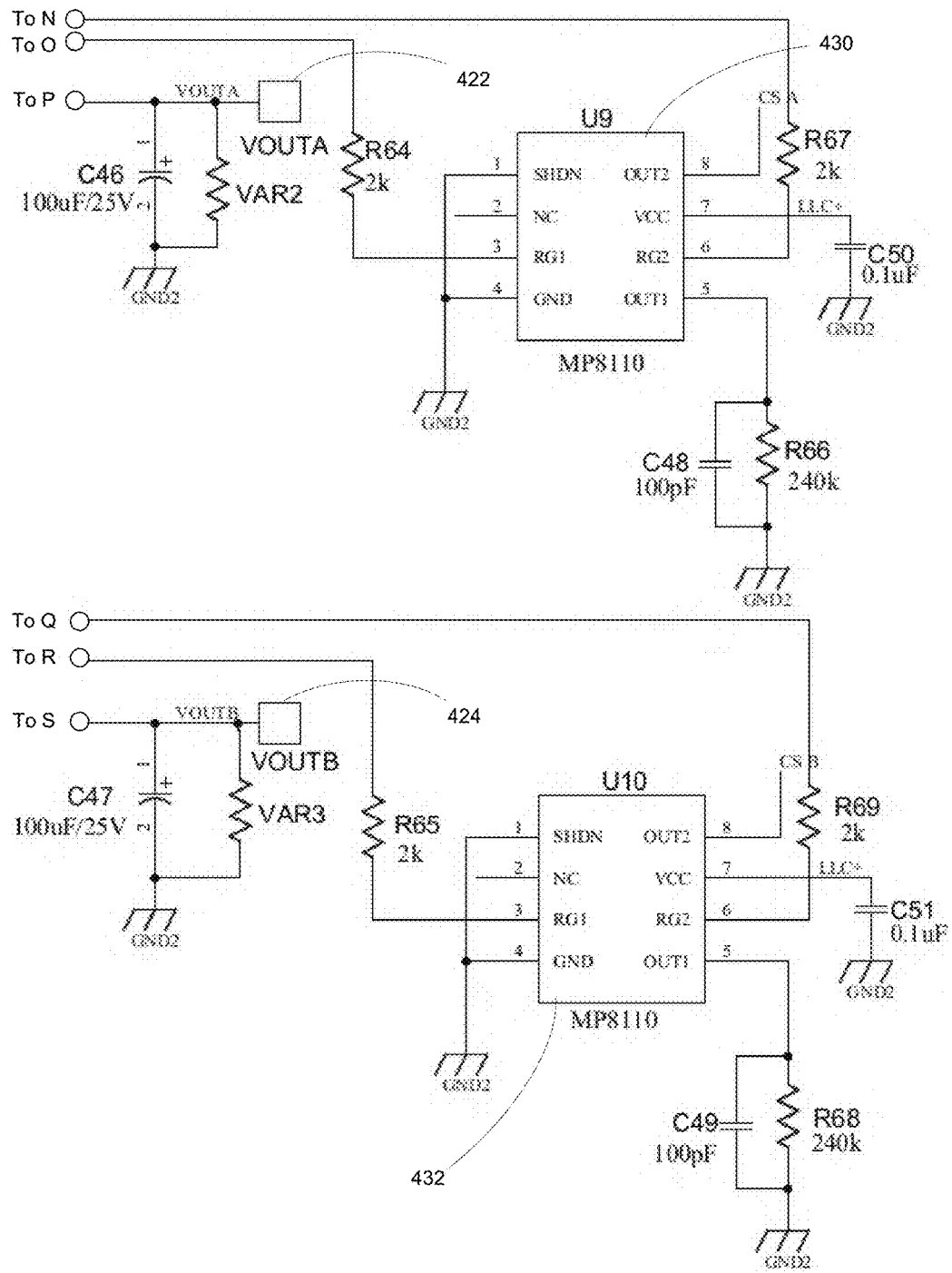
FIG. 4c2

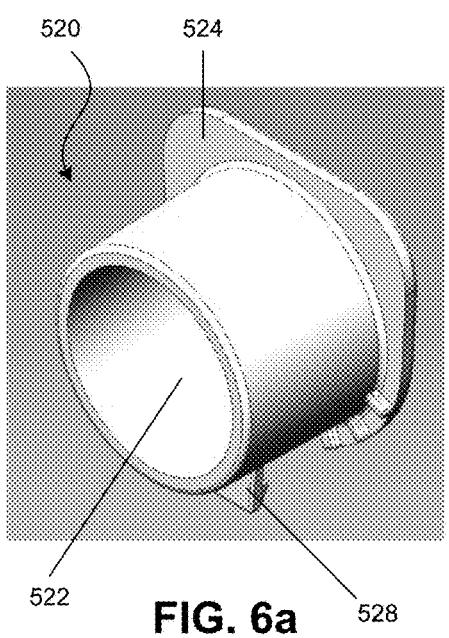 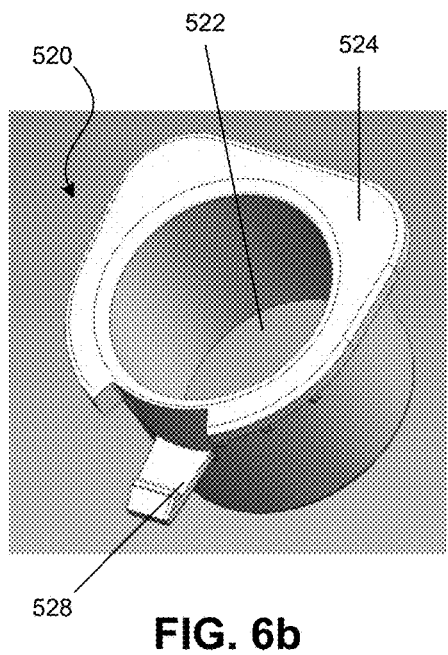
FIG. 6a   FIG. 6b
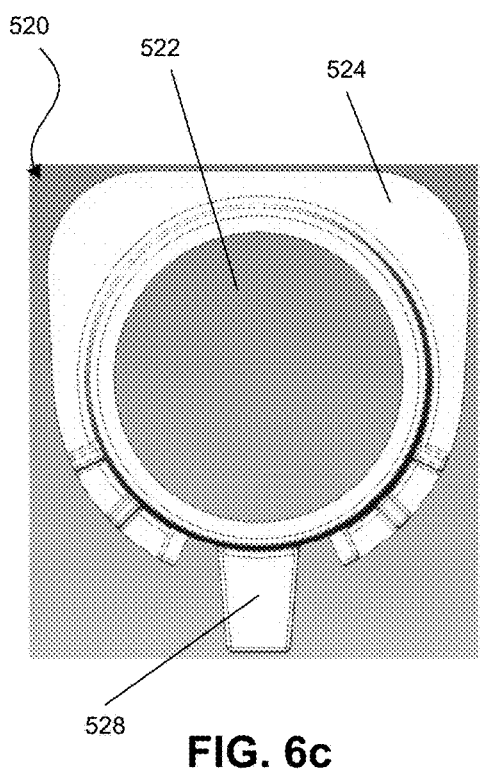 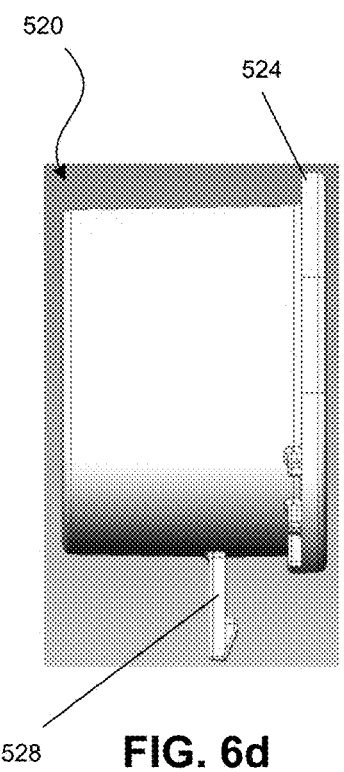
FIG. 6c   FIG. 6d

LOW VOLTAGE LIGHTING POWER SUPPLY SYSTEMS AND METHODS

CROSS REFERENCE TO RELATED APPLICATIONS

This application is a continuation of U.S. patent application Ser. No. 15/358,679, filed Nov. 22, 2016 which is a continuation of U.S. patent application Ser. No. 14/532,493, filed Nov. 4, 2014, which claims priority to and the benefit of U.S. Provisional Patent Application Ser. No. 61/899,564, filed Nov. 4, 2013, and also entitled "LOW VOLTAGE LIGHTING POWER SUPPLY SYSTEMS AND METHODS", the entire disclosures of all three of which are all incorporated herein by reference as though fully recited herein.

BACKGROUND

The present disclosure generally relates to the field of low voltage power supplies for low voltage lighting, for example landscape lighting systems.

In such systems, a plurality of lights is often powered by a single power supply. The power supply supplies power evenly to all lights, regardless of whether the lights have differing power or current requirements and regardless of whether a user prefers different brightness for different sets of lights (e.g., front lights, back lights, mounted lights, etc.). Also, different sets of lights on different power supplies easily lose synchronization and may turn on and/or off at different times even when the lights are intended to all turn on and/or off at the same time. Further, control of the lights requires use of a cumbersome interface on the power supply itself—if the power supply even has such an interface and allows for such control.

It is also often difficult to add and remove new sets of lights from the power supply. Typically, wires are run through PVC tubing in hole in the bottom of a landscape power supply. A large conduit nut secures the PVC tubing to the power supply's enclosure. The task of removing the nut and inserting and/or removing wires can be tedious. Moreover, it is often difficult for a user or technician installing such lights to determine how many lights can be safely connected to the power supply without causing an overload condition. Instead, a user or technician must engage in a time consuming trial and error process, and perhaps may even have to replace fuses when an overload condition occurs.

SUMMARY

The present application discloses systems and methods for providing low voltage power for low voltage lighting sources, e.g., so-called landscape lighting. In one exemplary system, a low voltage lighting power supply includes an enclosure and a power circuit enclosed in the enclosure. The power supply has a primary side and a secondary side. The primary side accepts power from a main power source and the secondary side has a plurality of separate output power circuits, each output power circuit generating a separate low voltage lighting power signal capable of lighting a plurality of low voltage light sources and each being rated for a particular output.

An exemplary method of installing a lighting fixture includes observing a real time power-related parameter of a power supply to which the lighting fixture is to be connected, connecting the lighting fixture to the power supply and observing the change in the real time power-related parameter of a power supply to which the lighting fixture was connected.

BRIEF DESCRIPTION OF DRAWINGS

Figs 4a1-4a2, 4b1-4b2 and 4c1-4c2 are circuit diagrams for exemplary embodiments of a power supply.

FIGS. 6a-6f are various views of an exemplary nozzle for the exemplary power supply of FIGS. 5a-5b.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless an express definition is provided herein.

Figure 1:
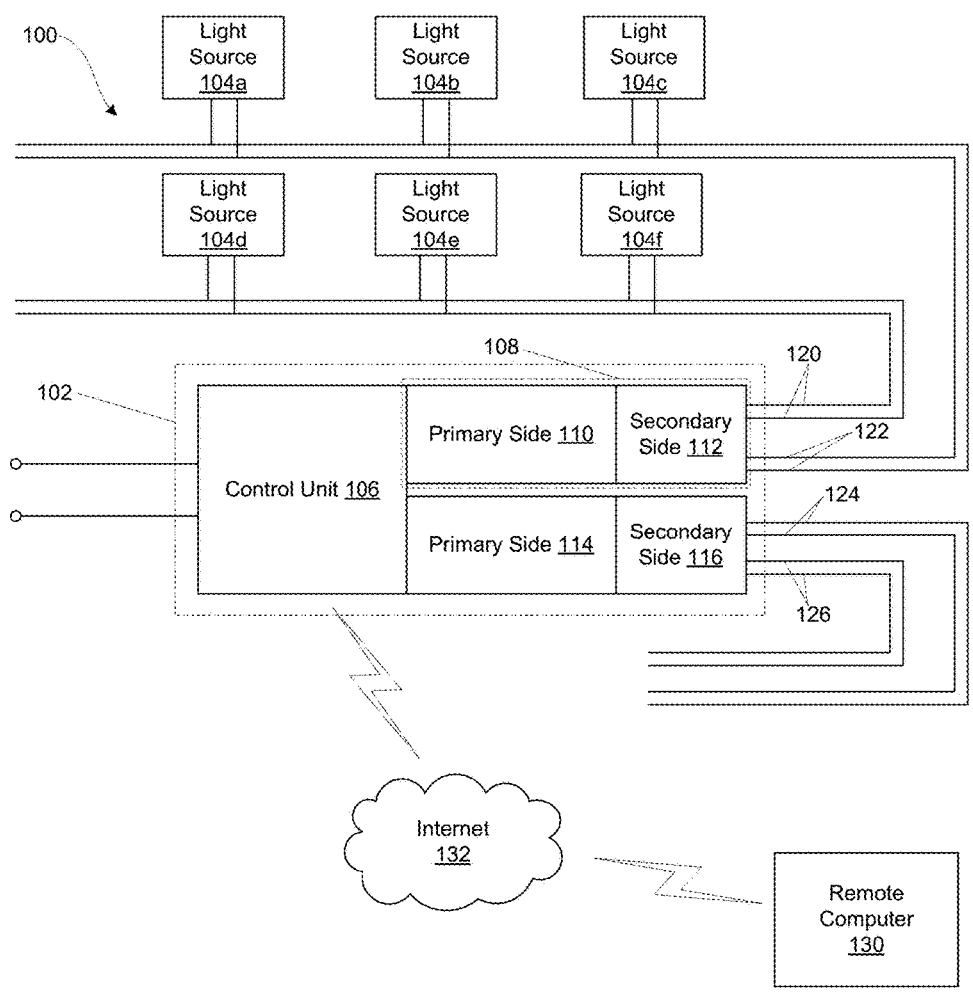
FIG. 1 is a high-level block diagram of an exemplary lighting system.

Referring now to FIG. 1, a block diagram of an exemplary lighting system 100 is shown. The system includes a power supply 102 and a plurality of light sources 104a-104f, e.g., LED light sources for outside use (so-called landscape lighting) or inside use (e.g., primary lighting, accent lighting, and/or undercabinet lighting). The power supply includes a control unit 106 and at least one power circuit 108 having a primary side 110 and a secondary side 112. Optionally, the power supply includes a plurality of separate power circuits, each having its own primary side and secondary side, such as primary side 110 and associated secondary side 112 and primary side 114 and associated secondary side 116. The primary side 110, 114 has a plurality of separate circuits, e.g., voltage converters, that accept power from a main power source and alter the main power to a form more suitable for the secondary side 112, 116. The secondary side 112, 116 has a plurality of separate output power circuits, e.g., voltage converters, each output power circuit generating one or more separate low voltage lighting power signals capable of lighting a plurality of low voltage light sources, e.g., light sources 104a-104f, groups of which are sometimes referred to as "zones."

In FIG. 1, secondary sides 112 and 116 are each shown generating two such separate low voltage lighting power signals, 120, 122, 124 and 126, capable of lighting a plurality of groups of low voltage light sources ("zones"). The entire power supply 102 and each power supply module, e.g., primary side 110, secondary side 112, etc., will typically be rated for a particular power/current output. For example, the entire power supply 102 may be rated for about 2.1 amps or about 360 watts and each secondary side 112, 116 may be rated for about 6.67 amps or about 100 watts, e.g., 7 amps×15 volts=105 watts. These exemplary numbers provide only rough order of magnitude numbers for context and are not intended to be limiting.

In exemplary embodiments, primary side 110 and/or secondary side 112 are in the form of a separate module and primary side 114 and/or secondary side 116 are in the form of a separate module. "Module" herein means a unitary piece that can be installed and/or removed as a whole unit, e.g., a plurality of components connected together via a circuit board. In an exemplary embodiment, each power supply module is rated for 100 W. On the primary side, the module will draw, in a worst case, 0.71 Amps ($I_{in}$=120 W/168$V_{pk}$)→120 W since the module is specified to have at least 80% efficiency under full load. Thus, a 300 LVPS system will draw $I_{in}$=0.71×3=2.13 Amps, and with a $V_{in}$=120*1.4=168 $V_{pk}$ the system will draw roughly 360 W.

The exemplary power supply 102 has a power supply control unit 106 having logic for controlling (e.g., turning off or on, limiting the current of, reducing the voltage of, etc.) any one or more of primary side 110, secondary side 112, primary side 114, and/or secondary side 116. "Logic," synonymous with "circuit" as used herein includes, but is not limited to, analog hardware, digital hardware, firmware, software and/or combinations of each to perform one or more functions or actions. For example, based on desired applications or needs, logic may include a software controlled processor, discrete logic such as an application specific integrated circuit (ASIC), programmed logic device, or other processor.

"Computer" or "processor" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), etc. Computer devices herein can have any of various configurations, such as handheld computers (e.g., so-called smart phones), pad computers, tablet laptop computers, desktop computers, and other configurations, and including other form factors. Logic may also be fully embodied as software.

"Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like.

In exemplary embodiments, any one or more of primary side 110, secondary side 112, primary side 114, and/or secondary side 116 have power measurement circuitry (not shown in FIG. 1) that measures a power-related parameter for the power supply 102 or for that portion of the power supply 102. In exemplary embodiments, the power measurement circuitry is a current sensor or other sensor capable of measuring in real time a parameter indicating the power output of the power supply 102 or that portion of the power supply to detect an imminent overload condition, which can damage the circuitry if maintained over seconds or minutes or weeks (depending on the degree of the overload condition).

"Real-time" and "real time" as used herein mean data that are used, stored, or transmitted for use or storage at the same time it is being generated or promptly after it is generated. Real-time data should be collected and transmitted or displayed soon enough and often enough to influence a process accepting the real-time data as an input used by the process. In the context of this application, in exemplary "real time" embodiments for automatic control of the various power supply portions by the control unit, it is expected that the power-related parameter will be measured for use by the control unit at least every five (5) seconds and in exemplary embodiments the power-related parameter will be measured and transmitted or displayed at least every one (1) second or multiple times per second, e.g., thirty (30) times per second. In contrast, in exemplary "real time" embodiments for an installer using the circuits herein to facilitate installing light sources, it is expected that the power-related parameter will be measured and transmitted or displayed on a display at least every one (1) minute and in exemplary embodiments the power-related parameter will be measured and transmitted or displayed at least every five (5) seconds or even every second or multiple times per second. In exemplary embodiments, each of the primary sides 110, 114 has such power measurement circuitry and each of the separate low voltage lighting power signals 120, 122 has such power measurement circuitry. "Automatic" and "automatically" as used herein mean without human intervention.

In exemplary embodiments, the power supply control unit logic includes a processor having a memory circuit with one or more non-transitory computer readable media of one or more data storage devices. As used herein, "data storage device" means a device for non-transitory storage of code or data, e.g., a device with a non-transitory computer readable medium. As used herein, "non-transitory computer readable medium" means any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., ROM, PROM, EPROM, EEPROM, flash PROM, external flash memory drives, etc. This memory circuit might include flash memory (or other solid state memory) and/or RAM and/or ROM memories, and/or one or more fixed disk drives and/or other memories. Memory circuits will have stored thereon logic modules for performing the various functions and processes described herein or a program to access such logic modules from a remote memory, such as a memory of access server (e.g., a browser program to access such logic modules from the server memory).

In this example, the processor is preprogrammed to perform any one or any two or more of the following: (a) automatically compare the measured real-time power-related parameters to applicable thresholds and take action if the comparison indicates action is needed; (b) automatically take a power overload action in response to a comparison of one of the measured power-related parameters to a threshold (indicating, e.g., a normal overload condition or a short circuit condition); and/or (c) automatically take a short circuit action in response to a comparison of one of the measured power-related parameters to a threshold. In exemplary embodiments, the low voltage lighting power supply has logic to take any one or any two or more of the following power overload actions in response to the comparison indicating a power overload condition (e.g., a normal overload condition or a short circuit condition): (a) automatically shut down the separate output power circuit having the power overload condition, e.g., a primary side, a secondary side, or a portion of a secondary side; (b) automatically shut down the separate low voltage lighting power signals having the power overload condition; (c) automatically shut down all the separate low voltage lighting power supply outputs; (d) automatically transmit a message to a computer remote from the low voltage lighting power supply; (e) automatically reduce the voltage or available current of one or more of the outputs of the separate output power circuit(s) having the power overload condition; (f) automatically reduce the voltage or available current of the separate low voltage lighting power signal(s) having the power overload condition; (g) automatically indicate to a user that an overload condition exists, e.g., via an audible alarm or a computerized message displayed on a computer display; (h) shut down the primary voltage to the power supply unit having the fault condition; and/or (i) accept from a pre-programmed remote computer an instruction to perform any of the foregoing. In exemplary embodiments, the specific one or more power overload actions taken depends on a magnitude of difference resulting from the comparison. For example, with an overload condition threshold of 105% of rated power being met, the control unit might be pre-programmed to take any of actions (a)-(i) above. Similarly, with a short circuit condition threshold of 125% of rated power being met, the control unit might be pre-programmed to take any of actions (a)-(i) above.

In exemplary embodiments, the low voltage lighting power supply has a light source installation mode in which the low voltage lighting power supply helps the installer know in real time how loaded each separate low voltage lighting power signal capable of lighting a plurality of low voltage light sources is (i.e., how loaded each "zone" is) so that as the installer installs each light source, the installer has some idea of whether that separate low voltage lighting power signal is capable of driving one or more additional light sources that are to be installed. In exemplary embodiments, the low voltage lighting power supply displays to an installer on a display of the low voltage lighting power supply in real time the real-time measured power-related parameter measured on the secondary side for a selected one or a selected two or more of the separate output power circuits and/or for a selected one or a selected two or more of the separate low voltage lighting power supply outputs.

In other exemplary embodiments, the low voltage lighting power supply transmits (e.g., wirelessly transmits) to the installer in real time the real-time measured power-related parameter measured on the secondary side for a selected one or a selected two or more of the separate output power circuits and/or for a selected one or a selected two or more of the separate low voltage lighting power supply outputs. The transmission can be via any suitable wired or wireless medium or media, such as any one or more of a Bluetooth signal, a low energy Bluetooth (BLE) signal, a Z-wave signal, an 802.15.4 (i.e., "Zigbee"), an 802.11 signal (WiFi), an NFC signal, a GPRS signal, a CDPD signal, a GSM signal, a UMTS signal, a CDMA signal, an LTE signal, a WiMax signal, an infrared signal, an ultraviolet signal, an acoustic signal, or some other wireless signal. In the alternative, the transmission can be via a wired medium, such as via a power signal (e.g., X10 signals carried by the conductors for the power signal) or some other wired connection, such as one or more conductors back to the low voltage lighting power supply and connected thereto via suitable connectors. In these examples, the low voltage lighting power supply may have corresponding communication circuitry and antennas, if necessary.

In exemplary embodiments, the low voltage lighting power supply in the light source installation mode simply monitors in real time the one or more real-time measured power-related parameters and indicates to the installer when one or more of the parameters is close to being at rated power but not yet overloaded, e.g., 90-99% of rated power, such as over 95% of rated power. For example, the low voltage lighting power supply can monitor in real time the real-time measured power-related parameter measured on the secondary side for a selected one or a selected two or more of the separate output power circuits and, in response to one or more of the real-time measured power-related parameter measured on the secondary side exceeding a threshold, indicating to an installer (e.g., via audible alarm or by wired or wireless transmission) that the one or more of the real-time measured power-related parameter measured on the secondary side have exceeded a threshold that does not indicate a power overload condition.

In exemplary embodiments, the low voltage lighting power supply comprises circuitry permitting unbalanced loading of a plurality of separate low voltage lighting power supply outputs that are output by that separate output power circuit. For example, returning to FIG. 1, one zone 120 of secondary side 112 can use 5% of the power capability of secondary side 112 and the other zone 122 of secondary side 112 can use 95% of the power capability of secondary side 112. Similarly, in FIG. 1 one zone 124 of secondary side 116 can use 40% of the power capability of secondary side 116 and the other zone 126 of secondary side 116 can use 60% of the power capability of secondary side 116.

In exemplary embodiments, the power supply 102 can be configured such that a power supply module and/or individual zones can be programmed to be tuned on or off or dimmed via a remote computer 130 (e.g., a handheld computer running an app or a handheld remote control such as an Aeon Labs Z-wave remote control) or remote sensors (e.g., Aeon Labs Z-Wave sensors, such as IR proximity sensors, door sensors, window sensors, etc.) or home control systems, e.g., a Z-wave Mi Casa Verde home automation controllers. The remote computer 130 may connect directly to the power supply 102 via any of the suitable wireless or wired connections described earlier, or indirectly via another network or networks, such as Internet 132.

The power supplies can be controlled (e.g., turn on/off, programmed, etc.) via software executing on the computer 130, e.g., an app executing on a smart phone (e.g., an iPhone®) or a tablet computer (e.g., an iPad®) via any of the wired or wireless media mentioned above. In exemplary embodiments, such software generates a graphical interface for adding light sources for control and controlling light sources. The software also transmits corresponding data to the low voltage lighting power supply 102. In exemplary embodiments, such software performs any one or any two or more of the following while adding light sources for control:

(a) Provides a software user input (not shown), e.g., an icon or other software user input with which the user can indicate a desire to add a light source or low voltage lighting power supply to be controlled by that computer;

(b) Provides a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can identify the specific light source or the low voltage lighting power supply being added;

(c) Provides a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can indicate whether the computer is controlling a zone or an individual low voltage lighting power supply and enter a name for that fixture or the low voltage lighting power supply;

(d) Provides a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can select or otherwise input an incremental brightness offset (such as a percentage) to increase or decrease the brightness of that low voltage lighting power supply or zone for one reason or another (e.g., to manually compensate for power signal line losses or the age of light source);

(e) Provide a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can select or otherwise input one or more power supply modules or zones of a power supply for which the power supply is to display and/or transmit a power-related parameter, e.g., real-time current or power;

(f) Provides a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can select or otherwise input one or more power supply modules or zones of a power supply for which the power supply is to immediately turn off or on; and/or (g) Provides a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can add a remote control or remote sensor and select or otherwise input one or more power supply modules or zones of a power supply for which the power supply is to turn off or on or dim in response to the remote control or remote sensor.

In exemplary embodiments, such software performs any one or any two or more of the following while controlling light sources and transmitting corresponding data to the low voltage lighting power supply:

(a) Provides a software user input (not shown), e.g., one or more pull-down menus or drop-down menus, one or more icons or hyperlinks, and/or one or more select-one radio button sets, and/or select-all radio button sets, and/or one or more freeform text fields into which text can be freely typed with a computer keyboard, with which a user can select one or more low voltage lighting power supplies and one or more zones to control;

(b) Provides a software user input (not shown), e.g., one or more pull-down menus or drop-down menus, one or more icons or sliders, and/or one or more select-one radio button sets, and/or select-all radio button sets, and/or one or more freeform text fields into which text can be freely typed with a computer keyboard, with which a user can turn on or turn off or control the brightness (voltage) of a low voltage lighting power supply or zone such as inputting on or off or inputting a brightness value (e.g., a percentage) or a range (high, medium, low, off) or the like;

(c) Provides a software user input (not shown), e.g., one or more pull-down menus or drop-down menus, one or more icons or sliders, and/or one or more select-one radio button sets, and/or select-all radio button sets, and/or one or more freeform text fields into which text can be freely typed with a computer keyboard, with which a user can incrementally increase or decrease the brightness (voltage) of a zone or an entire low voltage lighting power supply with each actuation of that user input (and/or continuously increase or decrease the brightness (voltage) of a low voltage lighting power supply or a zone while the user input is continually actuated);

(d) Provides a graphical display displaying to a user an indication of how brightly a selected low voltage lighting power supply or zone is being controlled, e.g., high, medium, low, or off or a specific percentage;

(e) Provides a software user input (not shown), e.g., one or more pull-down menus or drop-down menus, one or more icons or sliders, and/or one or more select-one radio button sets, and/or select-all radio button sets, and/or one or more freeform text fields into which text can be freely typed with a computer keyboard, with which a user can select a zone or power supply and clear a detected overload condition and cause the affected zone circuitry to become active;

(f) Provides a software user input (not shown), e.g., one or more pull-down menus or drop-down menus, one or more icons or sliders, and/or one or more select-one radio button sets, and/or select-all radio button sets, and/or one or more freeform text fields into which text can be freely typed with a computer keyboard, with which a user can select a zone or power supply and clear a detected short circuit condition and cause the affected zone circuitry to become active again.

Figure 2:
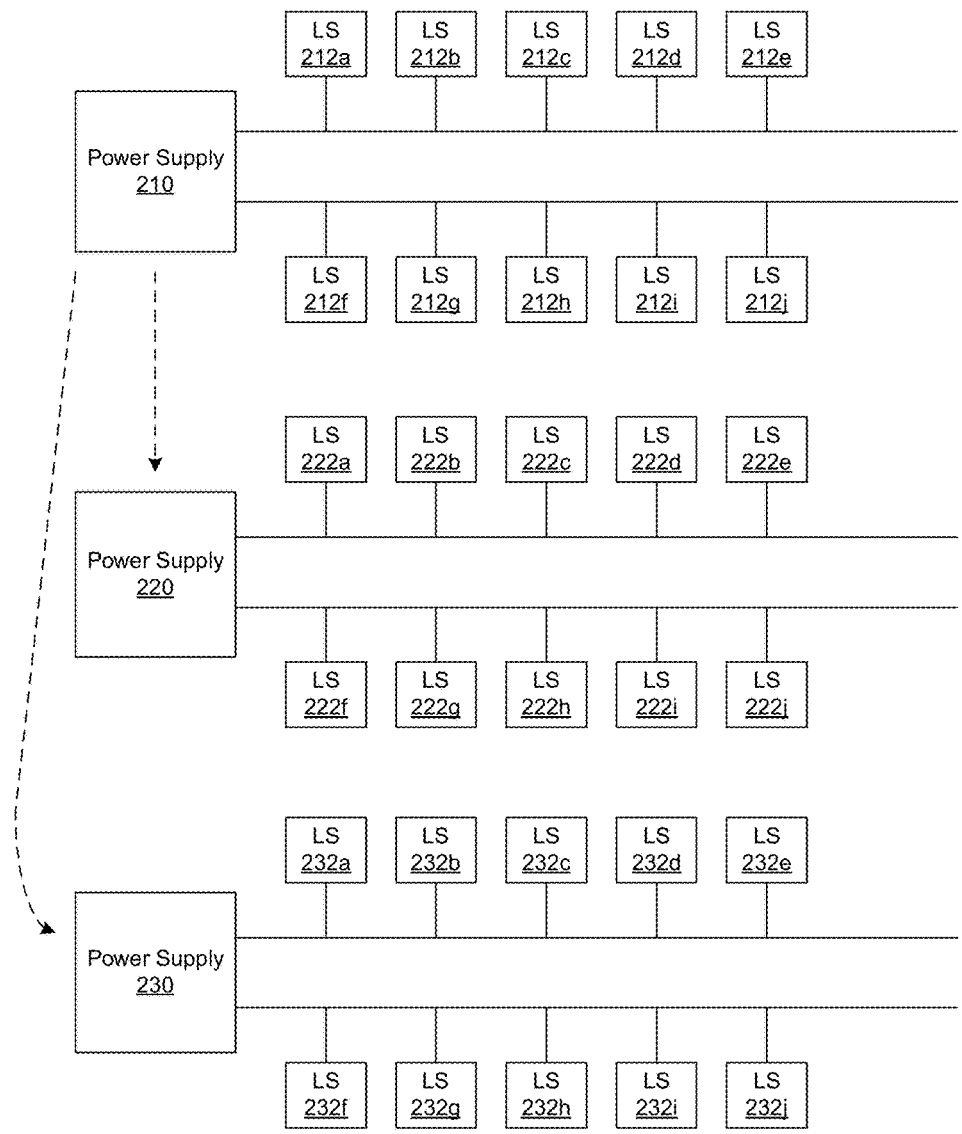
FIG. 2 is a high-level block diagram of another exemplary lighting system.

It is frustrating to have front lights on one power supply turn on five seconds after the back lights on a second power supply when they are all supposed to turn on and off at the same time. In exemplary embodiments, exemplified by FIG. 2, two or more of the low voltage lighting power supplies, e.g., power supplies 210, 220 and 230, having wireless or wired communication capability, synchronize lighting events, e.g., turning lights 212a-212j, 222a-222j, and 232a-232j on at the same time and turning them off at the same time. In exemplary embodiments, the plurality of low voltage lighting power supplies 210, 220 and 230 use the communication medium to synchronize their real time clocks, e.g., periodically (such as daily) one of the low voltage lighting power supplies transmits its RTC date, time, and geo-location settings to all the others, which set their respective RTCs to that date, time, and geo-location setting so that illumination instructions are carried out at the same time (whether based on absolute time of day or on sunrise and sunset calculated using geo-location settings). In the alternative, one power supply can simply transmit lighting event commands to the other power supplies wirelessly at the appropriate time for a particular zone or zones, e.g., turn on now or turn off now or perform sunrise lighting activities now or sunset lighting activities now.

Figure 3:
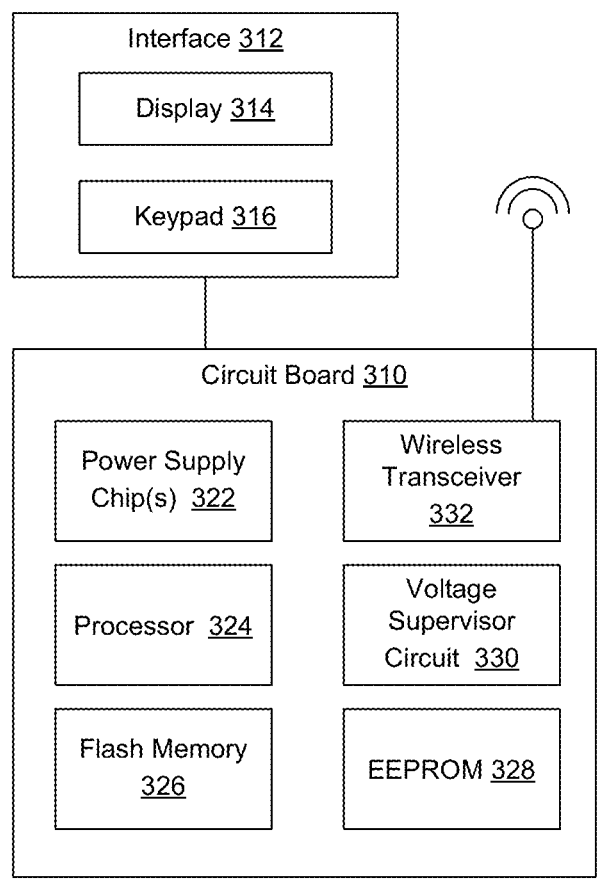
FIG. 3 is a high-level block diagram of an exemplary control system for an exemplary power supply.

The exemplary implementations of a low voltage power supply generate direct current (DC) constant voltage (e.g., 15 volts DC) outputs for driving the light sources. FIG. 3 illustrates a high-level block diagram of one such exemplary system 300. As can be seen, a controller board 310 is connected to an interface 312 that includes a display 314 and a keypad 316. The display 314 may be an liquid crystal display (LCD), light emitting diode (LED) array, or any other such suitable display. The keypad 316 may include any number of buttons, each of which may be associated with one or more numbers, letters, or directions (e.g., arrows). The display 314 may be positioned under a window proximate the keypad 316. The controller board 310 accepts user input from the keypad 316 and displays menus, data, etc. to users via the display 314.

The circuit board 310 includes one or two or more local power supply chips 322, for example model L78M05ABDT-TR linear voltage regulator and/or model LP2950CDT-3.3RKG LDO voltage regulator. The circuit board 310 also includes a pre-programmed processor 324, such as the PIC24FJ128GA008 microprocessor, a non-transitory (serial flash) memory 326, such as model SST25VF010A-33-4I-SAE, and a non-transitory (serial EEPROM) memory 328, such as model AT25128AN. The circuit board 310 further includes a voltage supervisor circuit 330, for example model MCP1322-29, that keeps the processor in reset until the system voltage has reached and stabilized at a proper level for reliable system operation. Also included is a wireless transceiver chip 332, for example model ZM3102, with which the processor communicates back and forth with external devices, i.e., a Z-Wave® transceiver chip.

Figs 4a1-4a2, 4b1-4b2 and 4c1-4c2 depict exemplary schematic diagrams for an exemplary implementation of a two-zone DC power supply module with primary and secondary sides with a 100 watt total capability shared between the two zones. The power supply module includes a power supply control chip 410, for example a model HR1000control chip, and a transformer 412 that steps down the voltage from the primary side and effectively separates the primary and secondary sides. Two power supply chips 414 and 416 on the secondary side, which may be, for example, model MP6903DS chips, form an LLC converter with the other adjacent components. Two outputs 422 and 424 (also labeled "VOUTA" and "VOUTB" respectively) are the two separate low voltage lighting power signals capable of lighting a plurality of low voltage light sources (i.e., the low voltage outputs for Zones A and B, respectively, for that circuit). Inputs 424 and 426 (also labeled "ENA" and "ENB" respectively) are used by the processor to enable and disable the low voltage outputs for Zones A and B, respectively, for that circuit. The processor driving inputs 424 and/or 426 high causes output 422 to go HIGH (to source current to the particular zone). The circuit further includes two current sensor chips 430 and 432, which may be, for example, model MP8110 chips, for the low voltage outputs for Zones A and B, respectively, for that circuit.

In this exemplary embodiment, for each zone (separate low voltage lighting power signals capable of lighting a plurality of low voltage light sources), the processor is programmed to turn off that individual zone if the power detected is greater than or equal to 105 watts, which is an overload condition. Current is measured to calculate power based on the constant 15 VDC output in these exemplary implementations. In other exemplary embodiments, actual output voltage can be measured and use to calculate power. An overload condition is cleared by removing the excessive load (e.g., removing a fixture or fixtures or removing the object causing the short circuit) and clearing the condition at the processor using a menu command at the display/keypad or other command, e.g., from a pre-programmed remote computer. For each of these zones (separate low voltage lighting power signals capable of lighting a plurality of low voltage light sources) the processor is programmed to turn off that individual zone if the power detected is greater than or equal to 125 watts (longer than a pre-determined delay to ensure that the 125 watts or greater is not due to inrush current), which is deemed to be a short circuit condition. A short circuit condition can only be cleared using a menu command at the display/keypad or other command, e.g., from a pre-programmed remote computer. In this exemplary embodiment, the processor does not monitor the primary side of the power supply modules (as is done in other exemplary embodiments). Instead, the SMPS controller IC will turn the whole supply module off if ~8 Amps is drawn from the supply for short duration (long enough to not be mistaken for in-rush and other such conditions).

FIG. 4c depicts an alternate embodiment of one part of the above-described two-zone power supply module with primary and secondary sides. This circuit is functionally the same as the circuit discussed immediately above, but instead uses a pair power supply control chips 432 and 434, such as, for example, model LM5069 chips, to implement the inputs 426 and 428 instead of discrete components.

Figure 5A:
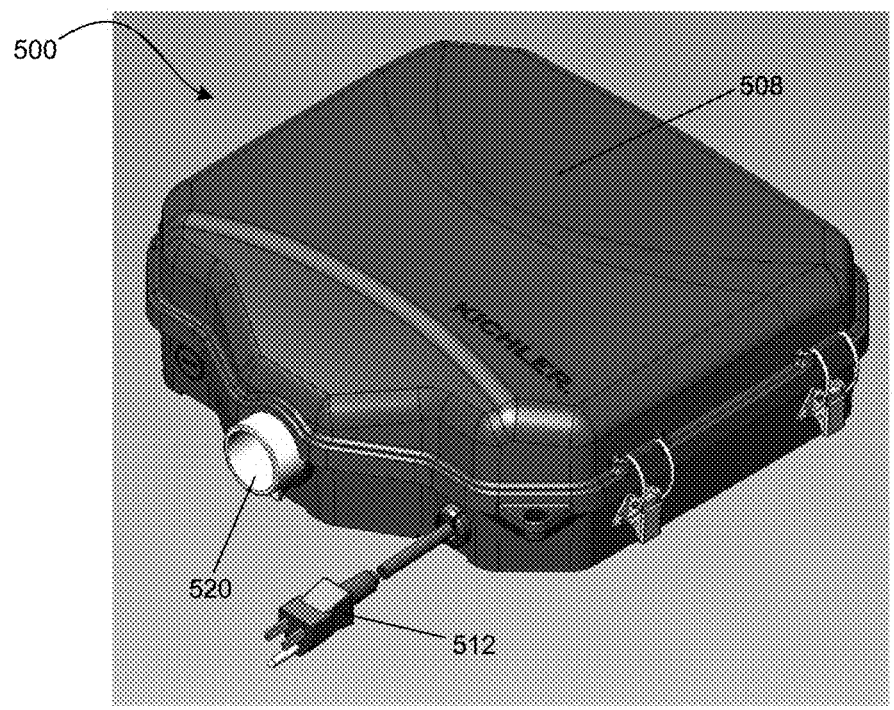
FIGS. 5a-5b are isometric views of an exemplary power supply in closed and open states, respectively.
Figure 5B:
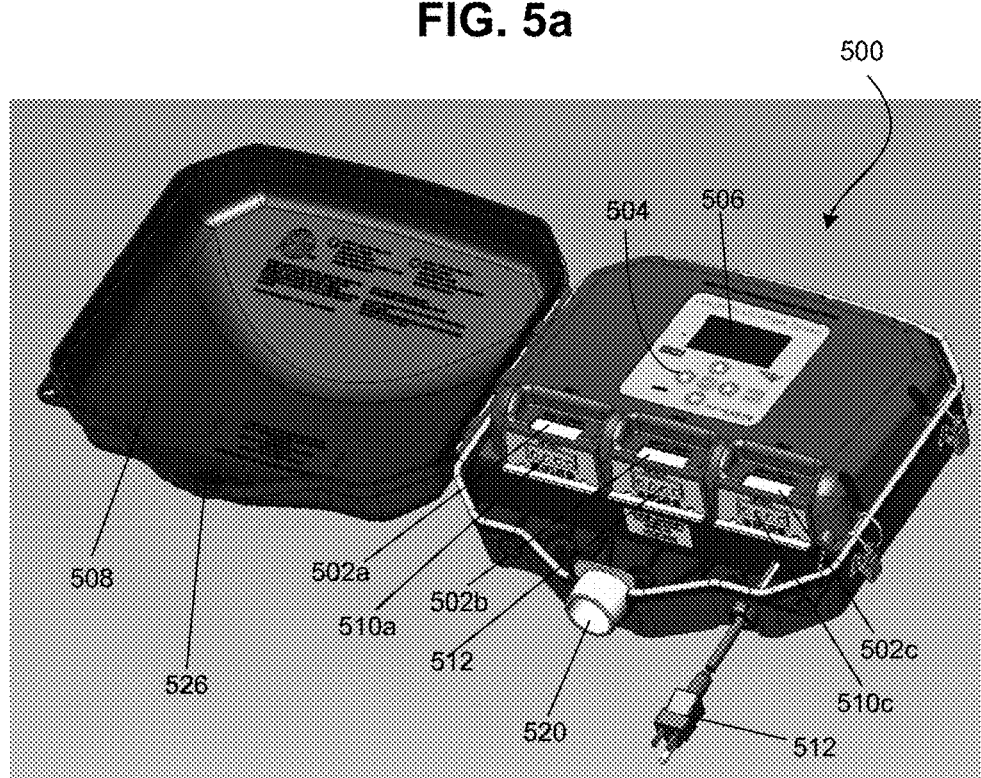
Figure 6F:
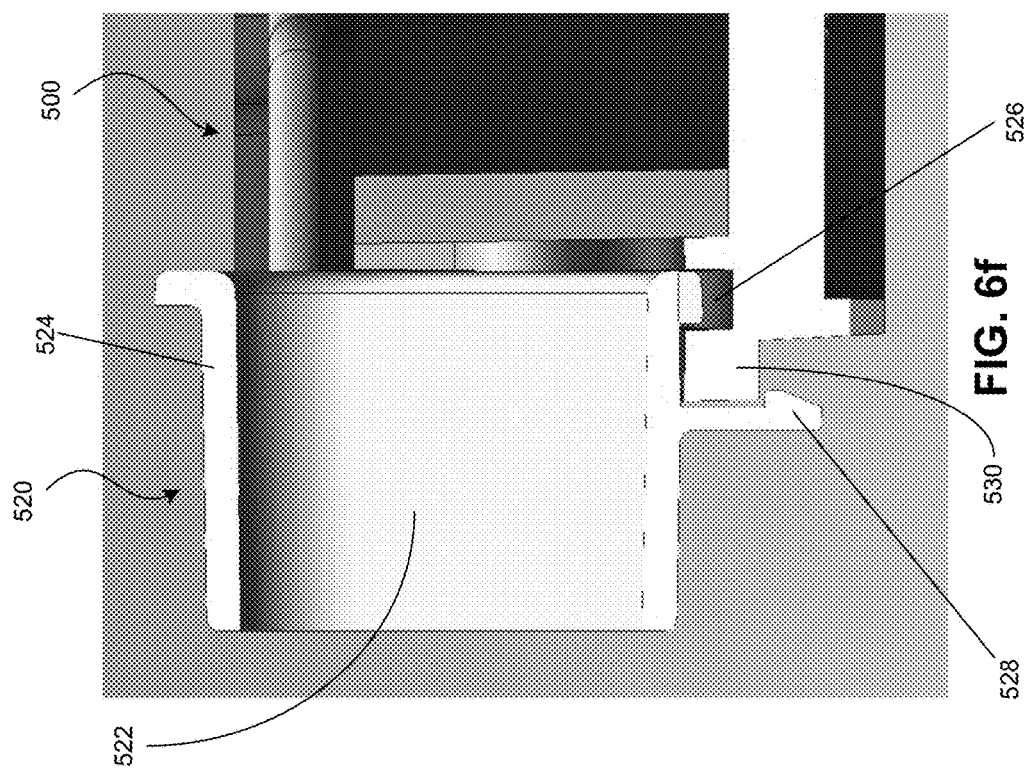
Figure 6E:
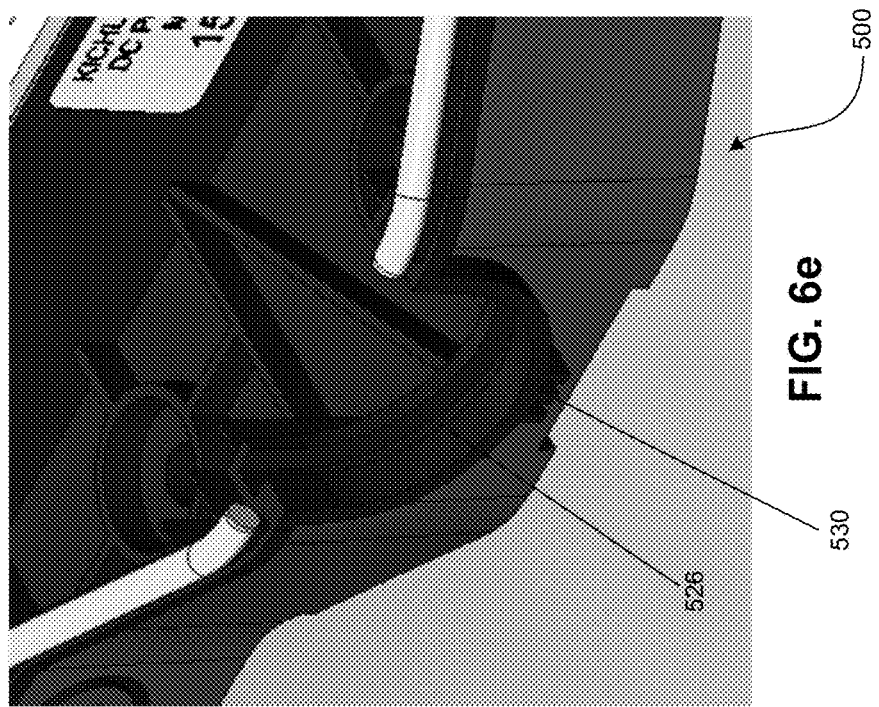
Figure 7B:
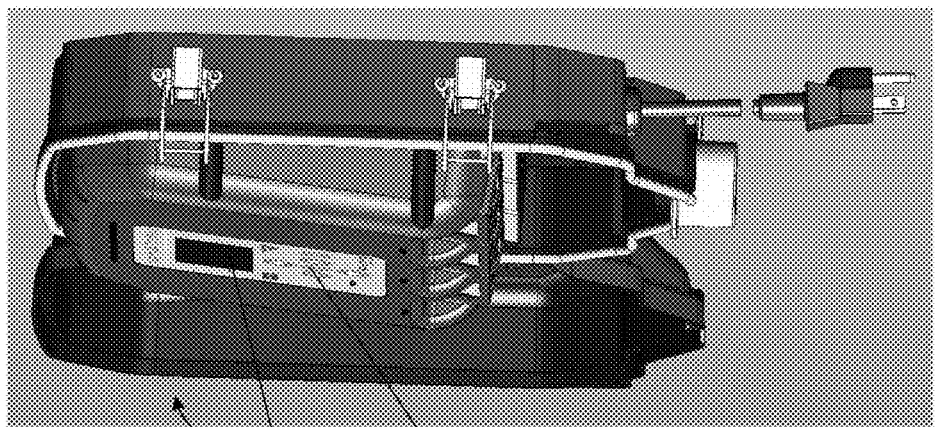
FIGS. 7a-7b are further views of the exemplary power supply of FIGS. 5a-5b.
Figure 7A:
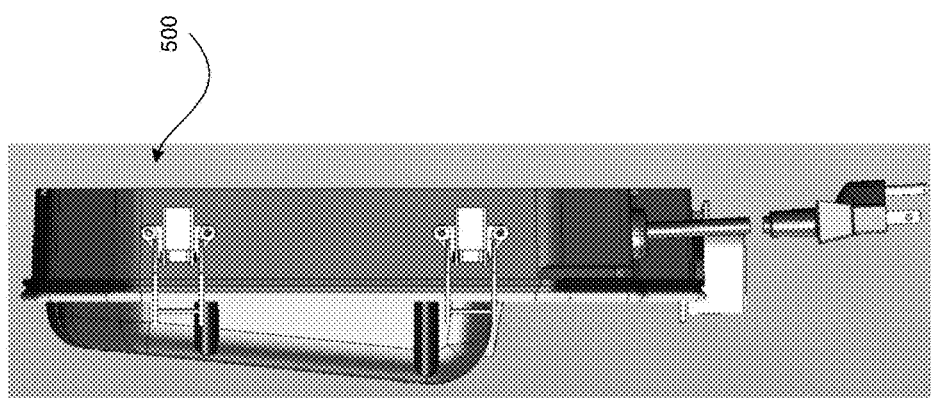

Referring now to FIGS. 5a and 5b, an exemplary enclosure 500 is shown in open closed and open states, respectively. The enclosure 500 has a hinged clam-shell design, which improves access to the wiring connectors of power supply modules 502a-502c. As can be seen in the figures, a keypad 504 and display 506, as described earlier, are protected by a hinged outer cover 508. The power supply has three separate modular power supplies 502a-502c(e.g., of the kind shown in Figs 4a1-4a2, 4b1-4b2 and 4c1-4c2), which can each be for example 100 watt power supplies, each of which powers two separate zones that can unevenly divide the 100 watts of power (note the three groups of four connector openings 510a-510c, one group at the bottom of each module, each group having two connectors for each zone). The power supply modules 502a-502c can be connected to the main power using any suitable connectors, e.g., flying leads on the individual power supply modules 502a-502c are connected to conductors of the power cord 512 shown above via a wire-nut.

The enclosure 500 features a nozzle 520 that helps with wire management. FIGS. 6a-6f show various views of the exemplary nozzle 520. The nozzle 520 has a through-hole 522 and a flange 524 (in this embodiment the flange 524 is a circumferential flange going most of the way around) held in place by a groove 526 in the upper and lower enclosure portions 500 (as seen more easily in FIG. 6e, with the nozzle 520 removed). Additionally, in this embodiment, the nozzle 520 is held in place in the groove 526 by a snap catch 528 held by a tab 530 at the bottom of the enclosure 500 in which it is placed.

In exemplary embodiments, the through-hole 522 is shaped to accept a length of tubing, e.g., sized to be a friction fit for 1½" trade size Schedule 40 PVC tubing, or any of a number of adapters, e.g., to step down the diameter to a small diameter PVC tubing. The nozzle 520 facilitates assembly and installation of the power supply and associated wiring by helping organize the wiring. For example, typical outdoor landscape lighting installations include PVC tubing to hide all of the "home run" wires coming from the ground (buried) to the power supply unit. During installation of the wiring, the nozzle 520 is detached from the enclosure 500 and removed from the groove 526. As an installer brings a length of wire to the enclosure 500 for connection, the installer merely picks up the nozzle 520 on a length of tubing, threads the wire through the tubing and through-hole 522 of the nozzle 520, and connects the electrical conductors in the wire to the connectors 510a-510c for the appropriate zone. After all the wires are connected, the installer simply picks up the nozzle 520 and tubing (with all the wires therethrough), guides the flange 524 into the groove 526 in the bottom of the enclosure 500, and snaps the catch 528 over the tab 530. The wires are thus secured and out of the way, and the hinged cover 508 of the enclosure 500 can simply be closed without worrying about pinching any of the wires between the two enclosure halves. This is much easier that running the wires through the PVC tubing and the hole typically in the bottom of a landscape power supply and then trying to install a large conduit nut to secure the PVC tubing to the enclosure.

As can be seen in the images 7a and 7b, when the enclosure 500 is mounted on a vertical surface (not shown), the display 506 is angled at an angle of about ten (10) degrees (in alternate embodiments, about five (5) to about thirty (30) degrees) for ease of viewing the display 506 and the keypad 504.

In exemplary embodiments, terminal blocks are mounted directly on the printed circuit boards (PCBs). This is for manufacturability and reduction of parts. By attaching the terminal blocks directly to the PCBs, the typical design of having "jumper wires" from the PCB or wire-wound transformer is eliminated. These jumper wires are also often a cause of field failure because they require periodic maintenance (tightening) that is not always done. By mounting the terminal blocks on the PCB, the PCB can be angled to create better access for the installer to the terminal block openings.

In an exemplary method of installing a lighting fixture, an installer mounts the enclosure, connects main power to the enclosure, e.g., via the three-prong plug described above or by hard-wiring, uses the user interface (e.g., keypad and menus or app on a remote computer) to turn on the power to a zone, uses the user interface to display the load on that zone or all the zones, observes a real time power-related parameter (e.g., watts and/or amps) for that zone, connects the lighting fixture to the zone of that power supply, and observes the change in the real time power-related parameter of that zone. Thus, the installer can watch the load on that zone steadily increase as fixture after fixture is added until all of the fixtures are connected or the zone is too close to its rated load to add any additional fixtures. If adding a last lighting fixture to the zone causes an overload condition, a fixture is removed and connected to a different zone. The user interface can be used to clear the overload condition, which is much more convenient than having to replace a fuse or reset a circuit breaker of the main power.

Some of the steps, acts, and other processes and portions of processes are described herein as being done "automatically." In the alternative, or in addition thereto, those steps, acts, and other processes and portions of processes can be done with one or more intervening human acts or other manual acts that eventually trigger the mentioned step(s), act(s), and/or other process(es) and/or process portion(s).

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, many of the examples herein are directed toward low voltage lighting, e.g., landscape lighting; much of the disclosure herein applies equally to other systems, such as 120 VAC residential and commercial lighting systems and 12 volt and 24 volt LED tape light.

As another example, the steps of all processes and methods herein can be performed in any order, unless two or more steps are expressly stated as being performed in a particular order, or certain steps inherently require a particular order. As yet another example, the power supplies herein are shown and described as having a primary side and a secondary side; other power supplies, e.g., battery-powered power supplies might not need a primary side per se. Instead, they have an output generating circuit generating a separate low voltage lighting power signal capable of lighting a plurality of low voltage light sources analogous to the secondary circuits herein. The discussions herein and claims herein, with respect to a power supply secondary circuit, also apply to output generating circuits without a primary circuit per se (which are also referred to herein as secondary sides in the sense that they are secondary to the main power source). Accordingly, departures may be made from such details without departing from the spirit or scope of the applicant's general inventive concept.

What is claimed is:

1. A modular low voltage lighting power supply, comprising:
   an enclosure having a cover, the enclosure housing a plurality of power supply modules that are accessible when the cover is in an open state and covered when the cover is in a closed state, each of the plurality of power supply modules being installed into the enclosure and removed from the enclosure as a whole unit; and
   a control unit enclosed in the enclosure, each of the plurality of power supply modules in communication with the control module;
   wherein each of the plurality of power supply modules comprises at least one primary side and a plurality of secondary sides, each secondary side generating a low voltage lighting power signal capable of lighting a plurality of low voltage light sources.

2. The modular low voltage lighting power supply of claim 1, wherein each of the plurality of power supply modules comprises at least one primary side and a plurality of secondary sides, each secondary side generating a low voltage direct current (DC) lighting power signal capable of lighting a plurality of low voltage light sources.

3. The modular low voltage lighting power supply of claim 2, where each secondary side is in communication with the control unit such that the control unit receives power-related parameters from the secondary side.

4. The modular low voltage lighting power supply of claim 3, where the control unit is configured to determine an available capacity of each of the secondary sides taking into account the loads connected to each respective secondary side.

5. The modular low voltage lighting power supply of claim 2, where the control unit is configured to determine an available capacity of each of the secondary sides taking into account the loads connected to each respective secondary side.

6. The modular low voltage lighting power supply of claim 1, where each primary side is in communication with the control unit such that the control unit receives power-related parameters from the primary side.

7. The modular low voltage lighting power supply of claim 6, where the power related parameters are selected from a list consisting of current, voltage, and power.

8. The modular low voltage lighting power supply of claim 6, where each secondary side is in communication with the control unit such that the control unit receives power-related parameters from the secondary side.

9. The modular low voltage lighting power supply of claim 8, where the control unit is configured to determine an available capacity of each of the secondary sides taking into account the loads connected to each respective secondary side.

10. The modular low voltage lighting power supply of claim 6, where the control unit is configured to determine an available capacity of each of the secondary sides taking into account the loads connected to each respective secondary side.

11. The modular low voltage lighting power supply of claim 2, where each primary side is in communication with the control unit such that the control unit receives power-related parameters from the primary side.

12. The modular low voltage lighting power supply of claim 11, where each secondary side is in communication with the control unit such that the control unit receives power-related parameters from the secondary side.

13. The modular low voltage lighting power supply of claim 12, where the control unit is configured to determine an available capacity of each of the secondary sides taking into account the loads connected to each respective secondary side.

14. The modular low voltage lighting power supply of claim 11, where the control unit is configured to determine an available capacity of each of the secondary sides taking into account the loads connected to each respective secondary side.

15. The modular low voltage lighting power supply of claim 1, where each secondary side is in communication with the control unit such that the control unit receives power-related parameters from the secondary side.

16. The modular low voltage lighting power supply of claim 15, where the control unit is configured to determine an available capacity of each of the secondary sides taking into account the loads connected to each respective secondary side.

17. The modular low voltage lighting power supply of claim 1, where the control unit is configured to determine an available capacity of each of the secondary sides taking into account the loads connected to each respective secondary side.

* * * * *